United States Patent
Sloffer et al.

(10) Patent No.: US 10,962,794 B2
(45) Date of Patent: Mar. 30, 2021

(54) LASER POINTER KIT FOR WOODWORKERS

(71) Applicants: Ty Sloffer, Noblesville, IN (US); Steven Price, Grayslake, IL (US)

(72) Inventors: Ty Sloffer, Noblesville, IN (US); Steven Price, Grayslake, IL (US)

( * ) Notice: Subject to any disclaimer, the term of this patent is extended or adjusted under 35 U.S.C. 154(b) by 0 days.

(21) Appl. No.: 16/554,563

(22) Filed: Aug. 28, 2019

(65) Prior Publication Data

US 2020/0073134 A1 Mar. 5, 2020

Related U.S. Application Data

(60) Provisional application No. 62/726,237, filed on Sep. 1, 2018.

(51) Int. Cl.
*G02B 27/20* (2006.01)
*G06F 3/038* (2013.01)

(52) U.S. Cl.
CPC ............. *G02B 27/20* (2013.01); *G06F 3/038* (2013.01); *G06F 3/0386* (2013.01)

(58) Field of Classification Search
CPC ....... G02B 27/20; G06F 3/0386; G06F 3/038; G06F 3/033
USPC .................................. 353/42; 362/259, 118
See application file for complete search history.

(56) References Cited

U.S. PATENT DOCUMENTS

| | | | |
|---|---|---|---|
| 5,193,897 A | 3/1993 | Halsey | |
| 5,307,253 A | 4/1994 | Jehn | |
| 5,343,376 A * | 8/1994 | Huang | G02B 27/20 362/187 |
| 5,663,828 A | 9/1997 | Knowles et al. | |
| 5,697,700 A | 12/1997 | Huang | |
| 5,803,582 A | 9/1998 | Huang | |
| 5,805,404 A * | 9/1998 | Kane | H04Q 1/146 361/111 |
| 5,882,106 A | 3/1999 | Galli | |
| 6,575,596 B2 | 6/2003 | Butt | |
| 7,043,775 B2 * | 5/2006 | Holtsnider | A61H 33/027 239/249 |
| 2005/0185404 A1* | 8/2005 | Khalili | G02B 27/20 362/259 |
| 2006/0226225 A1* | 10/2006 | Hsiao | G02B 27/20 235/454 |

* cited by examiner

*Primary Examiner* — William C. Dowling
(74) *Attorney, Agent, or Firm* — Ritchison Law Offices PC; John D Ritchison

(57) ABSTRACT

A laser pointer offered as a kit for woodworkers using blocks of wood of their choice to create hand crafted laser pointers. Similar to woodworking pen kits these Laser pointer kit for woodworkers create high quality "executive" style pens, this invention provides the ability to create "executive" style laser pointers that is certified to meet applicable U.S. laser safety requirements.

11 Claims, 11 Drawing Sheets

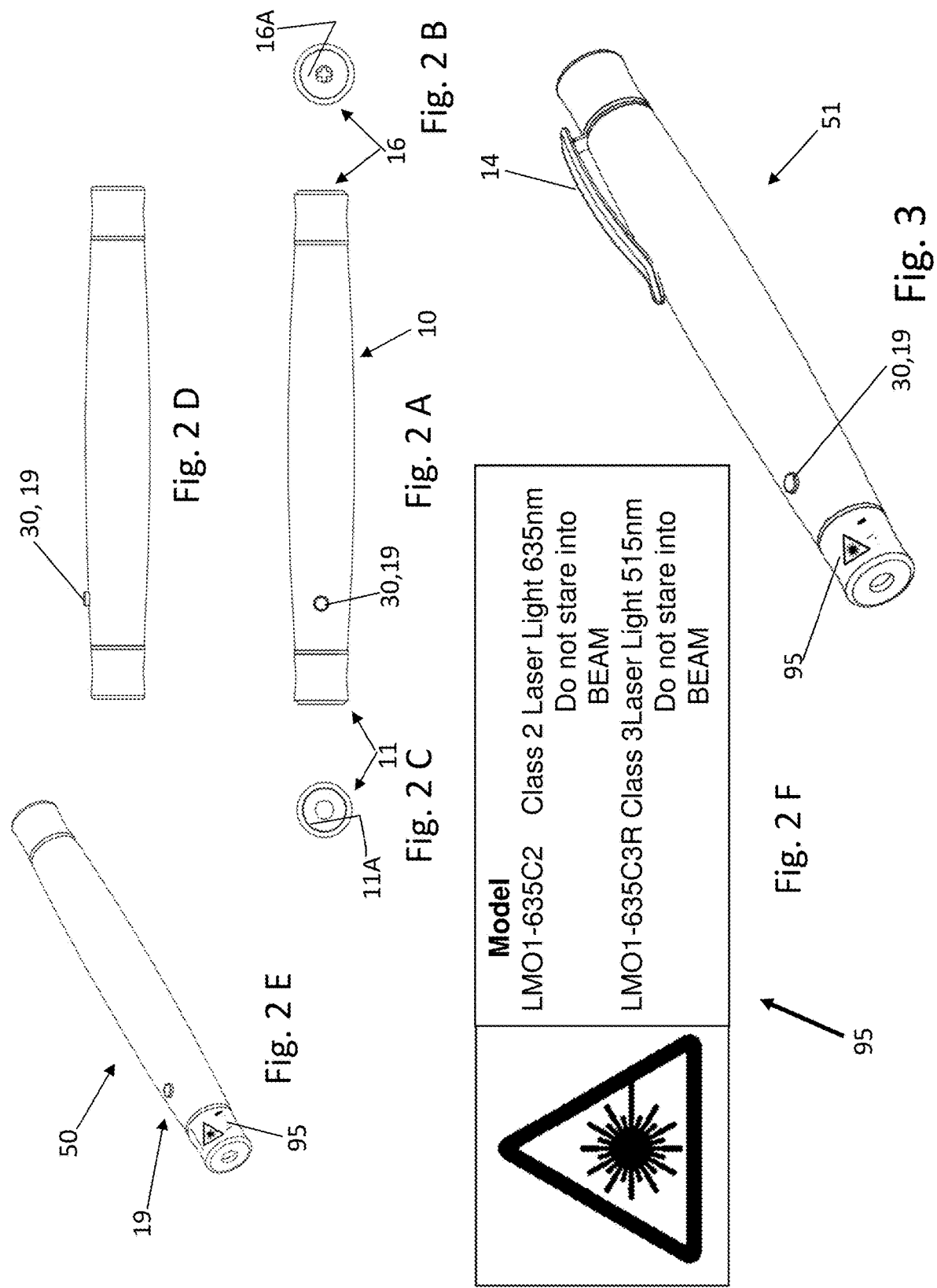

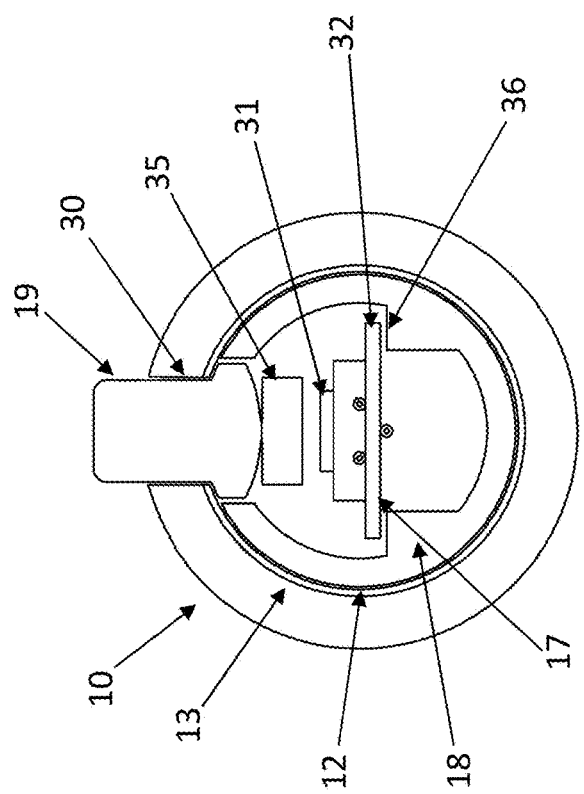
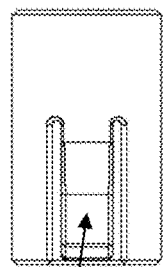
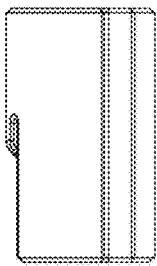
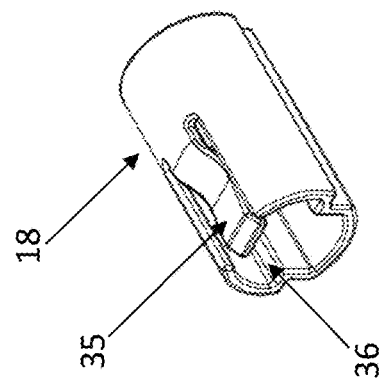

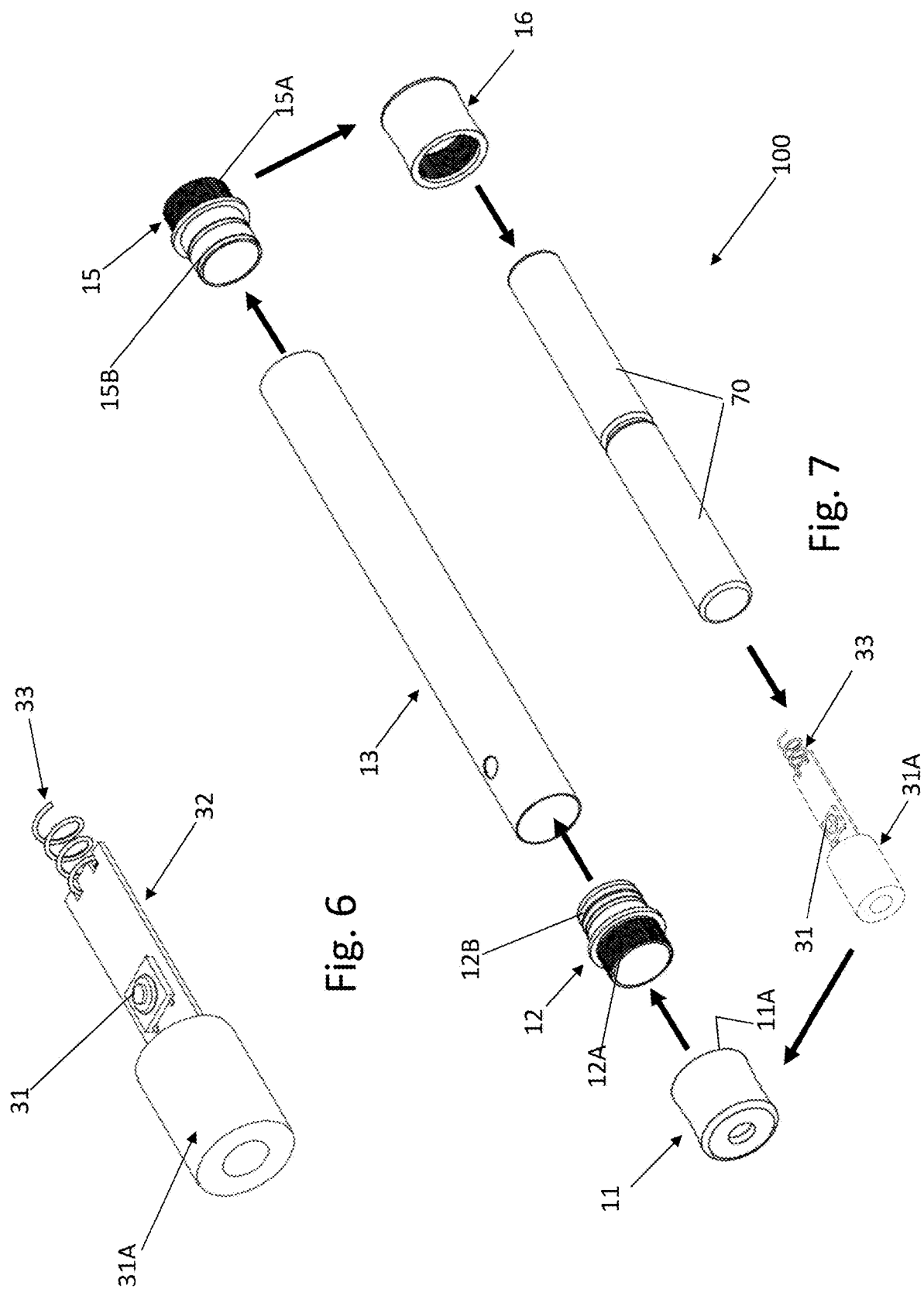

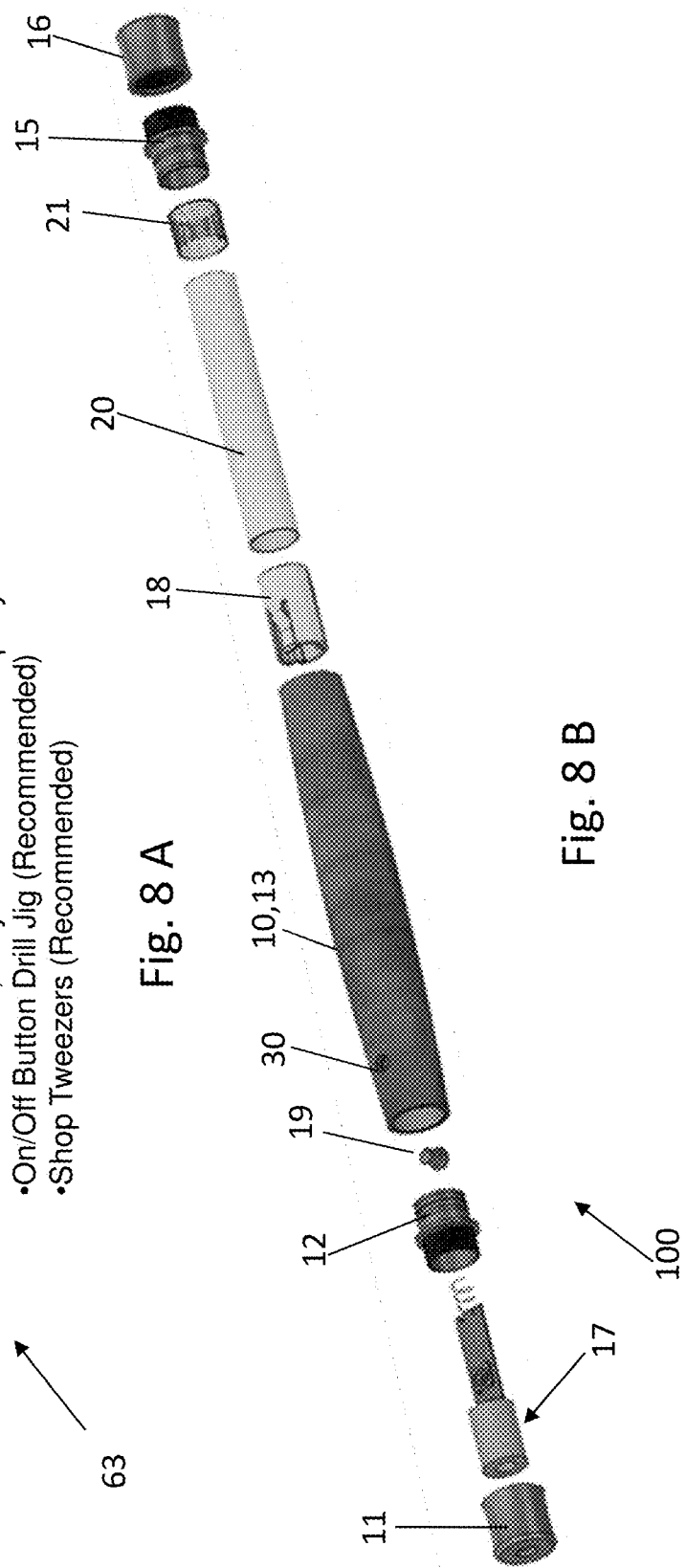

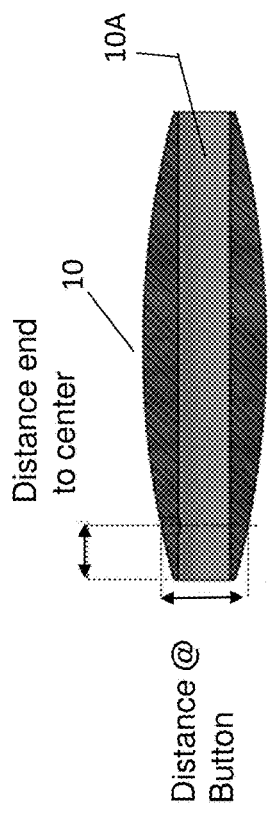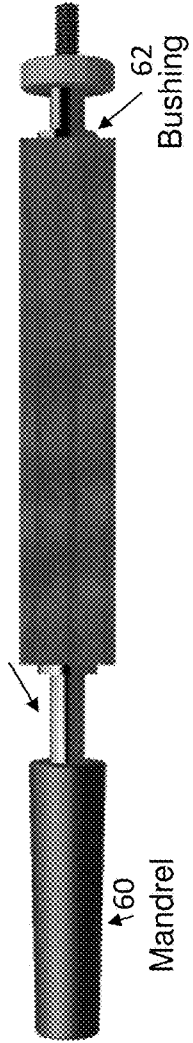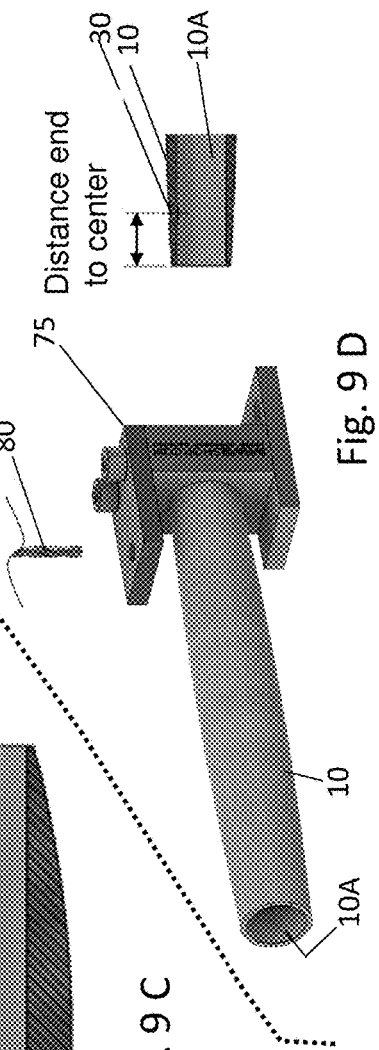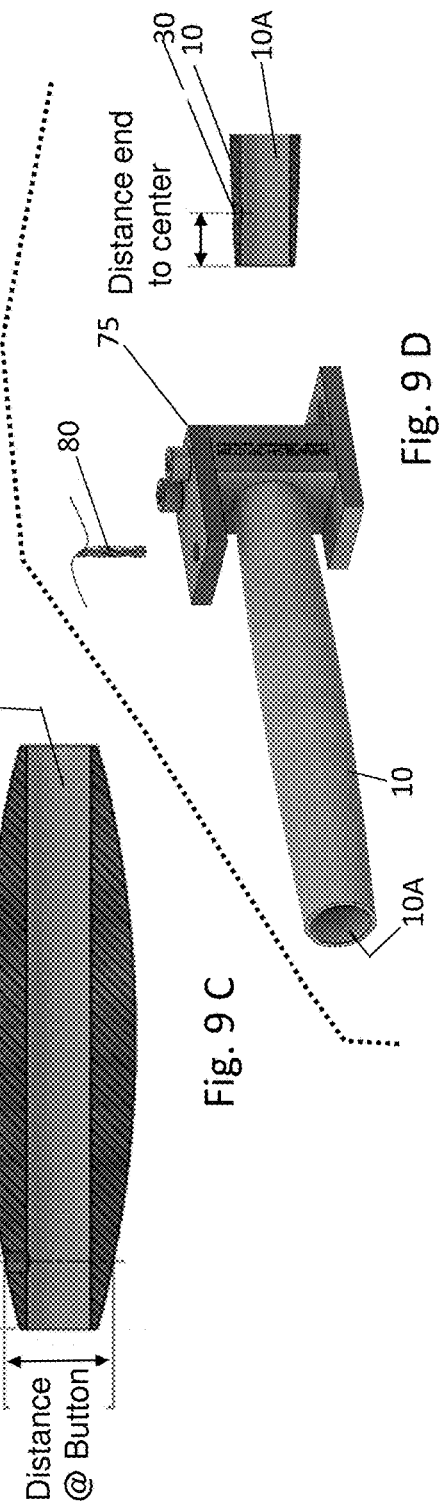
Fig. 9 A
Fig. 9 B
Fig. 9 C
Fig. 9 D

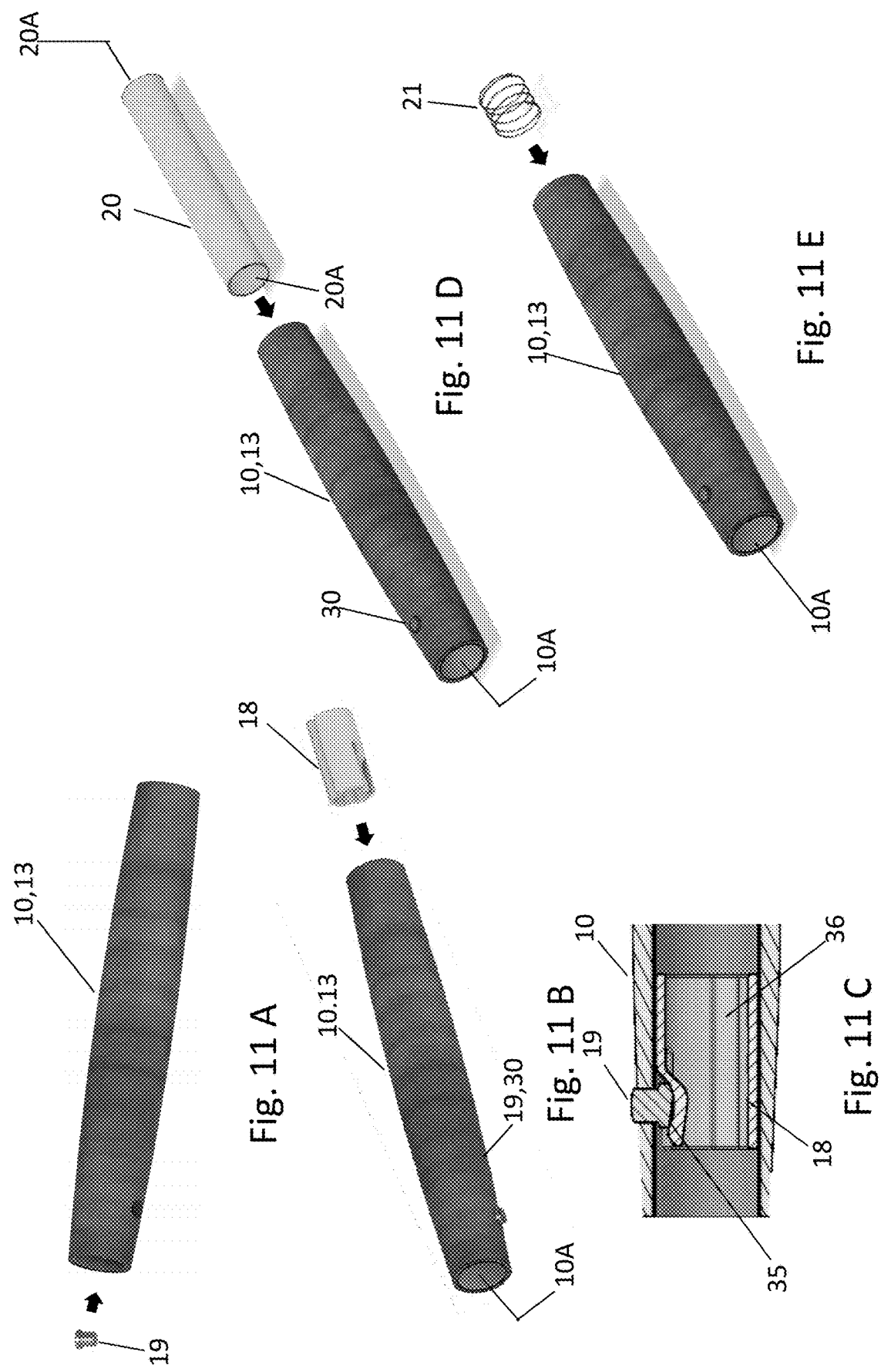

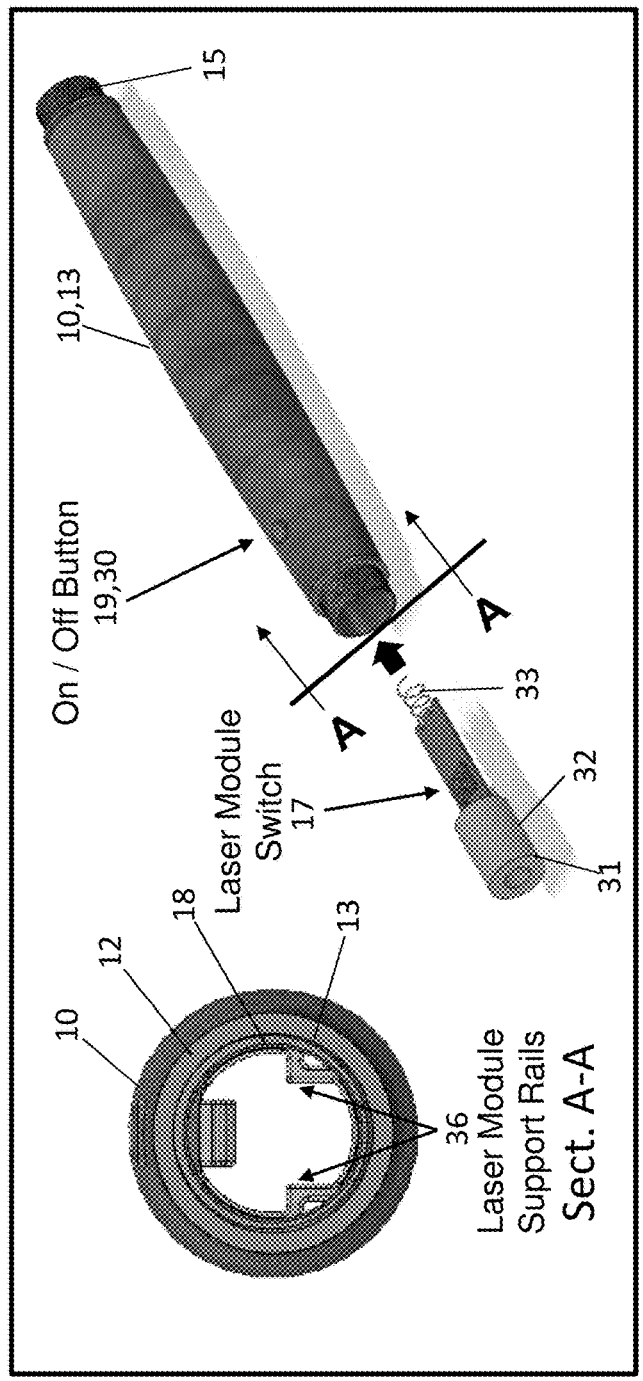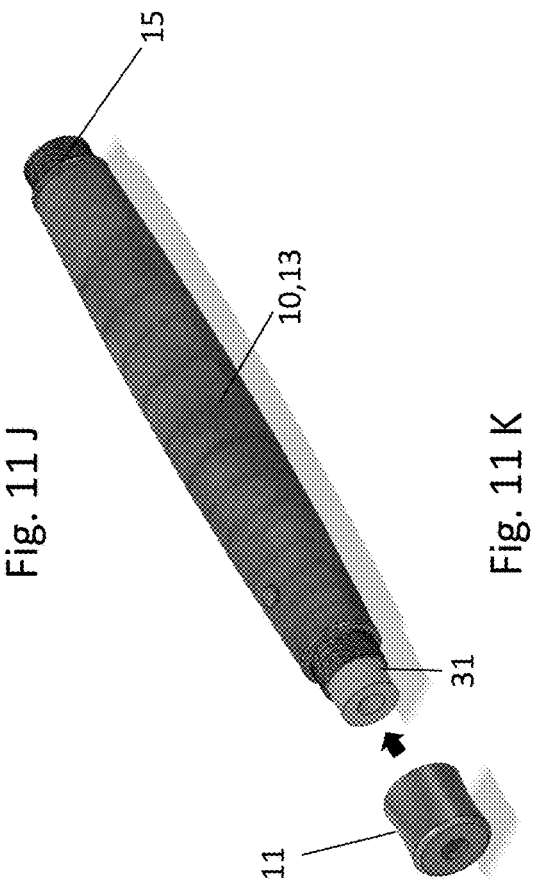
Fig. 11 J
Fig. 11 K

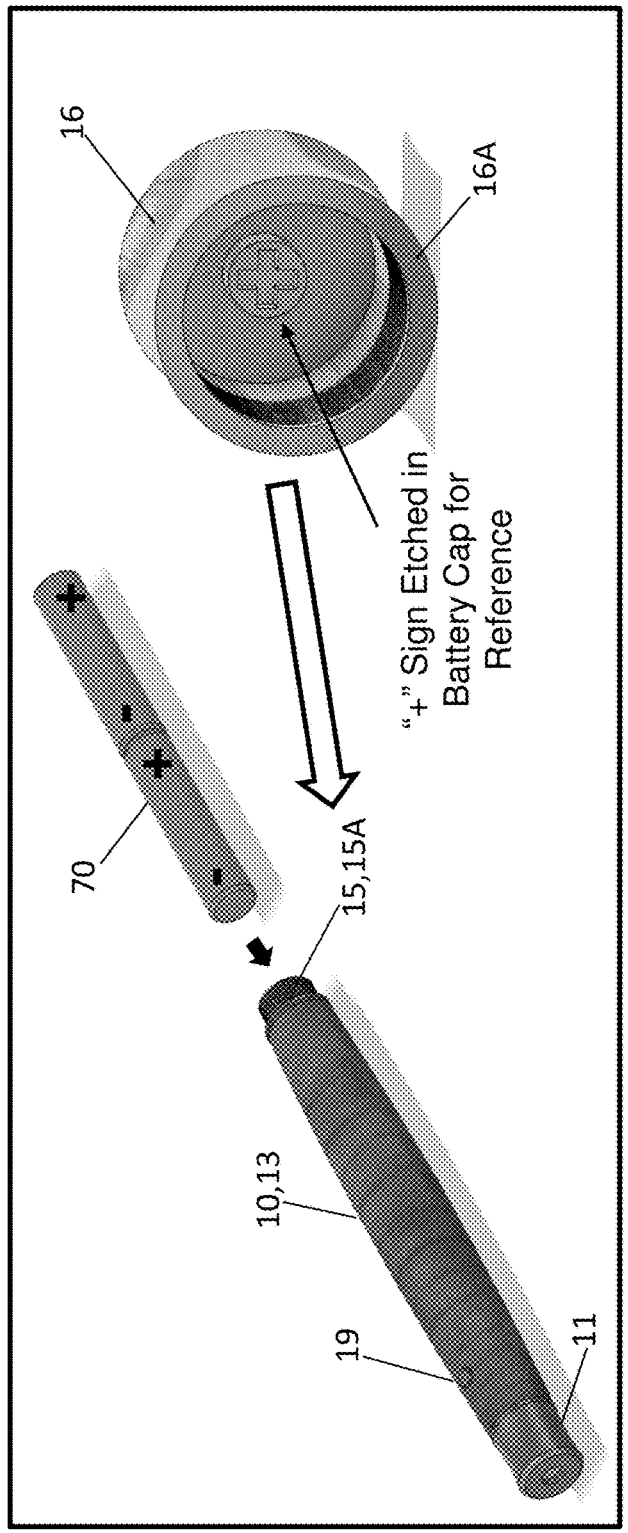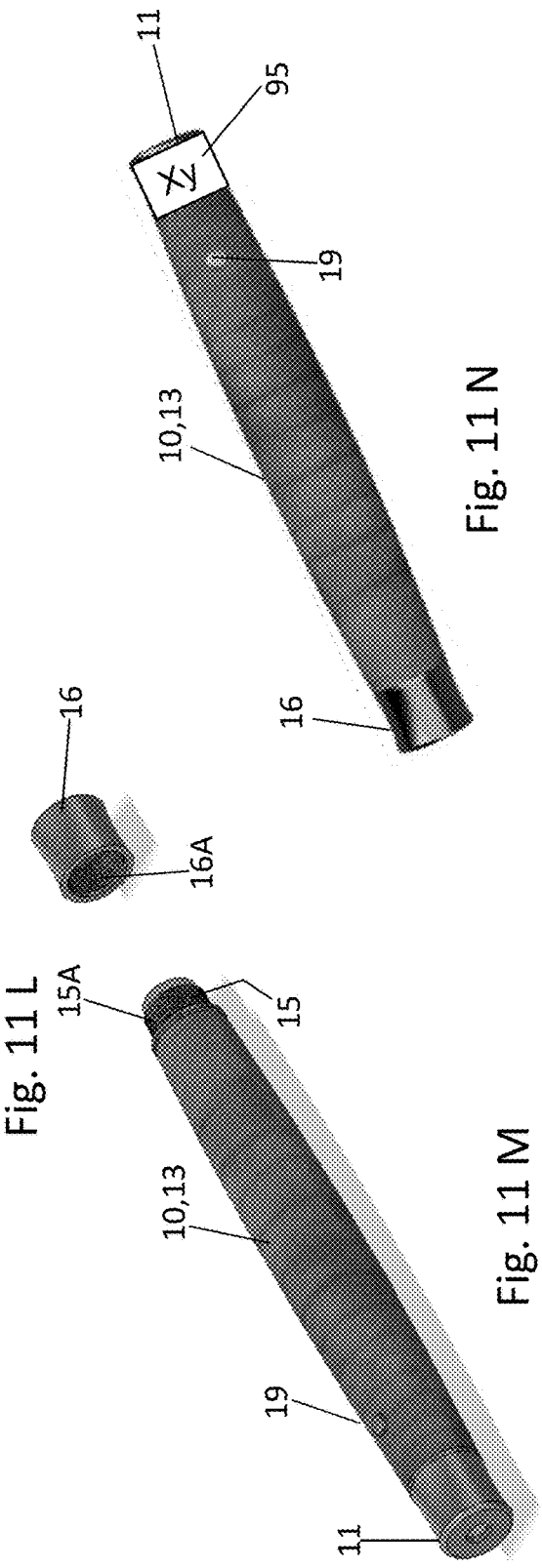
Fig. 11 L
Fig. 11 M
Fig. 11 N

LASER POINTER KIT FOR WOODWORKERS

CROSS-REFERENCE TO RELATED APPLICATIONS

This application claims the benefit of U.S. Provisional Patent Application with Ser. No. 62/726,237 filed Sep. 1, 2018, by Ty Sloffer and Steven Price. The application is entitled "Laser pointer kit for woodworkers".

FIELD OF INVENTION

This invention relates to woodworking project kits. Specifically, this invention pertains to a laser pointer kit which is designed to provide a woodworker the necessary hardware to build a laser pointer with a cylindrical enclosure created by the woodworker.

BACKGROUND

Woodworking is a craft in which people make things out of wood as a hobby or professionally. There is a large market that exists in woodworking kits whereby woodworkers purchase project kits. These project kits come with hardware and instructions to make the object simpler to build, as opposed to designing and/or sourcing the all the necessary hardware themselves.

Some project kits include everything required to craft the object including the wood. As an example, a bird house. The kit would comprise of all the necessary wood cut to the actual dimension, so the woodworker uses the kits and follow the instructions to build them.

Other project kits include everything except the wood. This gives the woodworker all the necessary hardware needed to complement the wood design for the final product. An example would be a knife kit. It would include instructions, the metal blade, and fastening hardware. The woodworker will choose their own type of wood and craft a wooden handle and use the hardware to complete the assembly.

There are many types of kits specifically for "wood turners". Wood turners are a type of woodworker who uses a lathe to "turn" wood. There are several kits available for wood turners in the market today for novelty and professional instruments. Pen kits are the most common. A pen kit normally comprises of instructions and all the non-wooden parts such as the end cap, tip, refillable pen, pocket clip, metal housing tube. Other types of wood turner kits include candlesticks, peppermill, bottle opener, etc. The woodworker will procure a "blank" which is commonly a rectangular block of wood for the wood turner to craft into a cylindrical piece that will fit the hardware provided in the kit. Wooden blanks come in many species of wood. Different wood species provide the woodworkers many options to choose from for color, texture, and grain patterns. There are even types of "blanks" made of non-wood materials such as plastic, stone, antlers, horns, etc.

Pen kits are very popular for wood turners. They are relatively simple to create and to make for gifts or to sell as high-quality pens which rival high-end pen manufacturers. The price of hand crafted executive pens is in the hundreds of dollars.

There are currently no laser pointer kits available in the market with the features and method to assemble as the one demonstrated here. This new kit meticulously follows the government regulations for laser pointers including those required by the Center for Devices and Radiological Health (CDRH) of the Federal Drug Administration (FDA) and the International Electrotechnical Commission (IEC). The governing body within the FDA that controls lasers is the CDRH. A laser pointer kit will create a new demand for wood turners to be able to create high quality, hand crafted laser pointers like pens.

Problem Solved

There are several problems solved by this new proposal. (1) By providing multiple on/off buttons of varying heights, the woodworker is not constrained for a specific diameter of the body. It will provide more options of sizes for the woodworker such that the on/off button protruding from the wood body is of a user-preferred height in terms of function and aesthetics. This allows a fitment to the round brass tube such that it will minimize the "play" or feel "loose" to the user while actuating the On/Off Button. (2) The laser module housing has a feature in which the laser module PCB of the laser module sits on the laser module housing shelf. This allows a solid base so that when the user actuates the on/off button, it will reliably actuate the laser module tact switch. Also, it provides support to the laser module PCB such that it will not flex thus causing damage to the PCB itself. (3) The laser module brass cylinder is one terminal of the electric connection. The laser module battery spring is the other terminal. To satisfy the electric connection of the batteries, the laser module brass cylinder conducts to the laser module sleeve, which conducts to the brass tube, which conducts to the battery sleeve, which conducts to the battery cap, which conducts to the battery. The second (optional) battery is in series with the first battery. The second battery likewise conducts to the laser module battery spring. If a short version is desired, a single 3 volt Li-Ion battery could be used. When the user presses the on/off button it will complete the electrical path to turn on the laser module. (4) The tube spring provides a benefit to allow more variability in the length of the overall assembled laser pointer kit. This will allow the unit to be functional with or without installing the pocket clip. It will also allow if the user happens to accidentally cut into the brass tube while turning the wood body. Without the tube spring, the tolerance of the length is very small to allow proper function. This gives the woodworker flexibility in the construction. And, (5) this prevents the batteries inside the brass tube from rattling inside if the user shakes the assembled laser pointer kit. It provides a snug fit for the batteries to fit in the brass tube with a common diameter tube size. It also provides the proper placement of the laser module housing inside the brass tube in conjunction with the tube spring.

PRIOR ART

As far as known, there are no laser pointer kits with the features and method to assemble as the one demonstrated here. This new kit follows the government including those required by the FDA and the IEC. It is believed that this product is unique in its design and technologies.

A. A U.S. Pat. No. 5,343,376 was issued to Huang in 1994 named Structure of Laser Pointer. It demonstrates a laser pointer that is disclosed including a laser module fitted into a conductive cylindrical casing and attached with a laser firing lens assembly and connected to a battery set and controlled by a switch to fire a laser beam for pointing, the laser module including a focus adjusting element threaded into the inner thread on the cylindrical shell thereof, whereby rotating the focus adjusting element on the cylindrical shell in either direction causes change of distance between the lens of the laser firing lens assembly and the laser diode of the laser module so that the focus is adjusted.

B. A U.S. Pat. No. 5,193,897 issued to Halsey in 1993 is entitled a Combined Pen and Light Pointer Apparatus. It shows a combined light pointer and marker that comprises a replaceable pen, an energy supply, a light source and an ON/OFF switch. When the light pointer is in use the tip of the pen is covered or retracted.

C. A U.S. Pat. No. 5,882,106 issued to Galli in 1999 was called a Thin Profile Laser Pointer Assembly. It portrays a thin profile laser pointer assembly that includes a thin profile laser head, a constant voltage laser diode driver circuit, and a coin cell power source all packaged within a thin-profile rectangular housing having a thickness between about 2.0 mm and about 6.0 mm. The laser head includes a thin, rectangular heat sink and a laser diode mounted on a recessed shelf on a front edge of the heat sink.

D. A U.S. Pat. No. 5,307,253 was issued to Jehn in 1994 entitled a Structure of Laser Pointer. It demonstrates a laser pointer that consisted of a laser module, a housing, a toggle switch, a push button ballpoint pen, a battery set, and a rotary cap, wherein the housing has chambers to hold the laser module, the battery set and the push button ballpoint pen, and a clip for hanging; the toggle switch has a press rod controlled by a button to press a leaf spring on a PC board so as to electrically connect the battery set to the laser module in causing the laser module to emit a laser beam for pointing to things.

E. A U.S. Patent Application 2005/0185404 was submitted by Khalili in 2005 for a Laser Pointer. It shows a light-weight, low cost of maintenance laser pointer for general purpose use that has a slim and short housing with safety protection plate place-able under a rotary cap enabling the apparatus to be safe when not in use. It is a laser module assembly for generating a laser beam with a single cell battery and an efficient voltage multiplying or voltage reduction DC to DC converter which enables use of a single cell battery. The device also allows usage of standard disposable and also variety of recharge-able batteries and provides fixed intensity output regardless of life stage of the battery.

F. A U.S. Pat. No. 6,575,596 issued to Butt in 2003 for a device entitled a Combination Stylus and Laser Pointer. This demonstrates a combination stylus and laser pointer for use in connection with a personal digital assistant (PDA), the combination having a thin slim-line housing enabling the apparatus to be stored in a groove or channel located on the PDA. It is a laser module assembly for generating a laser beam is secured within the housing on one end thereof. The device further includes an interchangeable stylus and pen tip that is secured within the housing at the opposite end thereof.

G. A U.S. Pat. No. 5,663,828 issued to Knowles in 1997 for a device called an Accessory Device for Modulating the Laser Output of a Pen-Clip Actuatable Laser Pointer. It portrays a laser beam experimentation kit, including an accessory device for modulating the intensity of the visible laser beam produced as output from a laser pointer. The accessory device comprises a printed circuit (PC) board of physically thin construction, which is adapted for slidable insertion between the conductive tip portion and the conductive housing portion of a pen-clip actuatable laser pointer.

H. A U.S. Pat. No. 5,803,582 was issued to Huang in 1998 for a product named a Laser Pointer. It showed a laser pointer which includes a barrel having two opposite inside pins at one end for mounting and a hanging hole at an opposite end for hanging, a socket sliding in the barrel at one end to hold a battery set, the socket having two longitudinal sliding slots at two opposite side respectively coupled to the inside pins of the barrel, and a laser module holder shaped like a stepped tube fixedly connected to one end of the socket to hold a semiconductor laser module on the inside and a press button on the outside near the socket. The press button is exposed to the outside for operation when the inside pins of the barrel are moved to one end of each longitudinal sliding slot of the socket; the press button is received inside the barrel and concealed from sight when the inside pins of the barrel are moved to the opposite end of each longitudinal sliding slot of the socket.

I. A U.S. Pat. No. 5,697,700 also issued to Huang in 2003 for a unit named a Handy Laser Pointer. This demonstrated a handy laser pointer including a cylindrical casing coated with a layer of phosphorescent substance and having a transverse through hole, a laser firing cap fastened to the front end of the casing by plugging, a rear end cap fastened to the rear end of the casing by a screw joint and having a hanging hole for hanging, an insulative sleeve mounted inside the casing, a laser module holder mounted inside the casing and abutted against the insulative sleeve, a battery set mounted in the insulative sleeve and connected to the rear end cap, and a laser module mounted inside the casing and fastened to the laser module holder, the laser module including a circuit board fastened to the laser module holder and having a switch, a laser generator connected to the circuit board and controlled by the switch to emit a laser beam through the laser firing cap, a button mounted in the transverse through hole of the casing and adapted for switching the switch, a metal spring connected between the circuit board and the battery set.

J. A US Patent Application No. 2006/0226225 was submitted by Hsiao et al. in 2006 entitled a Multifunctional Light Beam Pointer. It is a multifunctional light beam pointer that includes a case that houses a memory, a data transmission interface, a memory controller, and a laser light source. The memory controller is coupled to the memory and the data transmission interface for transferring data through the data transmission interface for storage in the memory. The laser light source emits a laser beam from the pointer.

As can be observed, none of the prior art has anticipated or caused one skilled in the art of Laser pointer kits and devices for woodworkers to see this new invention by Sloffer and Price as obvious to a person skilled in the ordinary art of the industry. For example, the fitment to the round brass tube provides the brass material as the preferred method. Any conductive metal could do this; however, brass is preferred because it is generally a standard material in pen making and the brass is used to make sure the wood body is rigid. The pointer provides an answer to the problems cited as well as a simple way to build a laser pointer device such as this device and process demonstrates. The new invention solves the problems as well as providing a better process to manufacture and build a laser pointer device.

OBJECTS AND ADVANTAGES

There are several objectives and advantages of the Laser pointer kit for woodworkers. There are currently no devices that are effective at providing the objectives of this invention. The Laser pointer kit for woodworkers use has various advantages and benefits:

TABLE A

| No. | Item | Detail |
|---|---|---|
| 1 | Adjustable button height | Providing multiple on/off buttons of varying heights such that the woodworker is not constrained for a specific diameter of the wood body. It will provide more options of sizes for the woodworker such that the on/off button protruding from the wood body is of a user-preferred height in terms of function and aesthetics. |
| 2 | Contoured on/off button shape | This allows a fitment to the round brass tube such that it will minimize the "play" or feel "loose" to the user while actuating the on/off button. |
| 3 | Laser module PCB support | The laser module housing has a feature in which the laser module PCB of the laser module sits on the laser module housing shelf. This allows a solid base so that when the user actuates the on/off button, it will reliably actuate the laser module tact switch. Also, it provides support to the laser module PCB such that it will not flex thus causing damage to the PCB itself. |
| 4 | Brass tube + tube spring providing electric path for battery | The laser module brass cylinder is one terminal of the electric connection. (in this example the "+" <positive>). The laser module battery spring is the other terminal (in this example the "−" <negative>. To satisfy the electric connection of the batteries, the laser module brass cylinder "+" conducts to the laser module sleeve, which conducts to the brass tube, which conducts to the battery sleeve, which conducts to the battery cap, which conducts to the "+" of the battery. The second battery is in series with the first battery. The second battery "−" conducts to the laser module battery spring. When the user presses the on/off button it will complete the electrical path to turn on the laser module. |
| 5 | Tube spring that allows for varying lengths | The tube spring provides a benefit to allow more variability in the length of the overall assembled laser pointer kit. This will allow the unit to be functional with or without installing the pocket clip. It will also allow if the user happens to accidentally cut into the brass tube while turning the wood body. Without the tube spring, the tolerance of the length is very small to allow proper function. This gives the woodworker flexibility in the construction. |
| 6 | Battery tube | This prevents the batteries inside the brass tube from rattling inside if the user shakes the assembled laser pointer kit. It provides a snug fit for the batteries to fit in the brass tube with a common diameter tube size. It also provides the proper placement of the laser module housing inside the brass tube in conjunction with the tube spring. |
| 7 | Build and assembly | The design aspects of this laser module housing is developed with a |

TABLE A-continued

| No. | Item | Detail |
|---|---|---|
| | process | unique way to retain the on/off button while the laser pointer is assembled. This method provides an interface between the on/off button and the tact switch on the laser module. This is a critical design aspect that has allowed a kit like this. The other kits on the market have been ones with an entirely pre-assembled laser module/on/off button which basically equates to half of a laser pointer. This means that the woodworker only has the creative freedom to turn the other half. This new, unique design doesn't require a metal housing. That feature without a metal housing allows the entire body of the laser pointer to be part of the body and artistic instrument created by the wood turner. |

BRIEF SUMMARY OF THE INVENTION

A laser pointer kit for wood turners to be able to create hand crafted laser pointers. A preferred special laser pointer kit comprising: (a) a body with two ends, made of durable wood materials with a hollow opening throughout length of the body, with an on/off button hole at one end, and with a battery tube placed inside the hollow opening; (b) a laser module cap with a threaded connection to connect the module cap to a laser sleeve; (c) a laser module sleeve with a threaded connection to connect the laser module sleeve to the module cap and a set of ridges to connect the laser module sleeve to the battery tube; (d) the brass Tube with a hollow opening throughout length of the brass tube; (e) a battery sleeve with a threaded connection to connect the battery sleeve to a battery cap and a set of ridges to connect the battery sleeve to the brass tube; (f) the battery cap with a threaded connection to connect a battery cap the battery sleeve; (g) a laser module housing comprised of a laser module tact switch; a laser module brass cylinder; a laser module printed circuit board; a laser module battery spring; a laser module brass cylinder; a laser module housing spring board; and a laser module housing shelf wherein altogether these components are considered the laser module; (h) an on/off button placed in the on/off button hole of the body; (i) a battery tube with a hollow opening throughout length of the battery tube and inter-placed between a tube spring and the laser module housing; (j) the tube spring inter-placed between the battery cap and the battery tube; and (k) a safety label wherein with these components and a set of batteries a woodworker is able to create a hand-crafted laser pointer.

BRIEF DESCRIPTION OF THE DRAWINGS

The accompanying drawings, which are incorporated in and constitute a part of this specification, illustrate an embodiment of the laser pointer kit for woodworkers that is preferred. The drawings together with the summary description given above and a detailed description given below serve to explain the principles of the laser device. It is understood, however, that the laser pointer kit for woodworkers is not limited to only the precise arrangements and instrumentalities shown.

FIGS. 2 A through 2 F are views of an assembled laser pointer kit 50 with the turned wood from the woodworker.

FIG. 3 is a view of an assembled laser kit with pocket clip 51 with the turned wood from the woodworker.

FIG. 4 is a cross sectional view of the assembled laser pointer kit 50.

FIGS. 5 A through 5 D are detailed views of the laser module housing 18 depicting the laser module housing spring board 35 and laser module housing shelf 36.

FIG. 6 is a view of the laser module 17 with references to specific components of the laser module 17.

FIG. 7 depicts the electrical path to complete the circuit of the laser pointer kit 100.

FIGS. 8 A and 8 B are detailed views of the tools required 63 to assemble laser kit 100 and an isometric drawing of the component parts of the laser kit 100.

FIGS. 9 A through 9 D are detailed views of turning the laser pointer body 10 depicting how the body is sized and prepared.

DESCRIPTION OF THE DRAWINGS—REFERENCE NUMERALS

Figure 1:
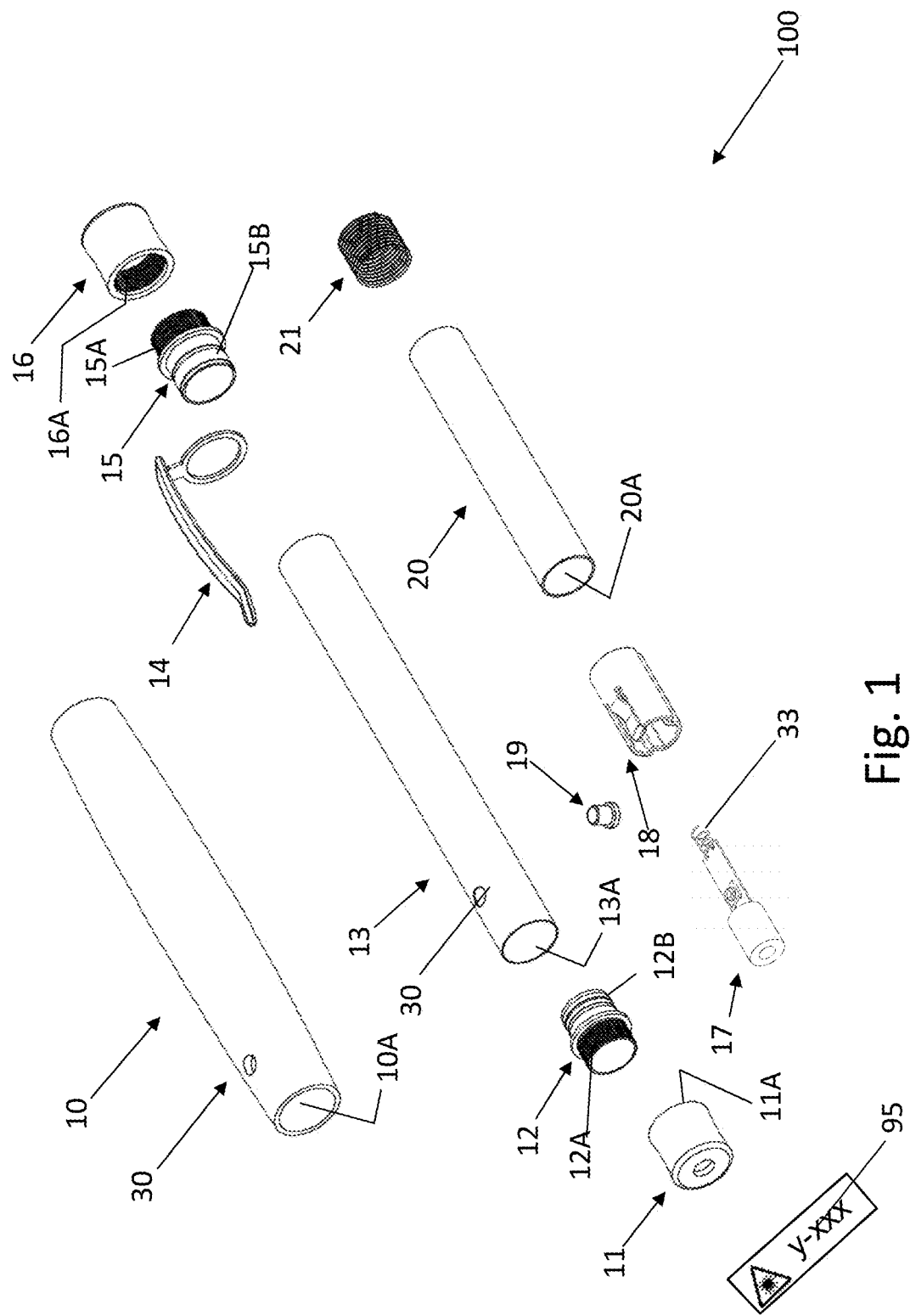
FIG. 1 depicts an exploded view of all the parts required to assemble a laser Kit 100 except for two AAA-batteries.

The following list refers to the drawings:

TABLE B

| Ref # | Description |
|---|---|
| 10 | body 10 with two ends and made of a durable material (supplied by woodworker) such as various hard and soft woods, plastic, ivory, metals, stone, antlers, horns, etc. |
| 10A | hollow opening 10A throughout the body 10 |
| 11 | laser module cap 11 that may be finished as chrome, titanium, gold, black titanium, 10K gold and rhodium |
| 11A | means to connect 11A the laser module cap 11 such as threads, interference fit, conductive adhesive, etc. to the laser module sleeve 12 |
| 12 | laser module sleeve 12 |
| 12A | means to connect 12A the laser module sleeve 12 such as threads, interference fit, conductive adhesive, etc. to the laser module cap 11 |
| 12B | means to connect 12B the laser module sleeve 12 such as ribs, interference fit, conductive adhesive, etc. to the brass tube 13 |
| 13 | brass tube 13 |
| 13A | hollow opening 13A throughout length of the brass tube 13 |
| 14 | pocket clip 14 |
| 14A | encircling clip ring 14A of the pocket clip 14 |
| 15 | battery sleeve 15 |
| 15A | means to connect 15A battery sleeve 15 such as threads, ridges, interference fit, conductive adhesive, etc. |
| 15B | means to connect 15B the battery sleeve 15 such as ribs, interference fit, conductive adhesive, etc. to the brass tube 13 |
| 16 | battery cap 16 |
| 16A | means to connect 16A battery cap 16 such as such as threads, ridges, interference fit, conductive adhesive, etc. |
| 17 | laser module 17 |
| 18 | laser module housing 18 |
| 19 | on/off button 19 |
| 20 | battery tube 20 |
| 20A | hollow opening 20A throughout the entire length of the battery tube 20 |

TABLE B-continued

| Ref # | Description |
|---|---|
| 21 | tube spring 21 |
| 30 | on/off button hole 30 |
| 31 | laser module tact switch 31 |
| 31A | laser module brass cylinder 31A |
| 32 | laser module printed circuit board (PCB) 32 |
| 33 | laser module battery spring 33 |
| 34 | laser module brass cylinder 34 |
| 35 | laser module housing 36 spring board 35 |
| 36 | laser module housing shelf 36 |
| 50 | assembled laser pointer kit 50 |
| 51 | assembled laser pointer kit 51 with pocket clip |
| 60 | mandrel 60 |
| 61 | mandrel spacer 61 |
| 63 | tools required 63 to assemble laser kit 100 |
| 65 | bushing 65 |
| 70 | batteries 70 double A, triple A, AAAA, C or equal; rechargeable or not; lithium ion, alkaline, nickel cadmium, nickel metal hydride, or the like |
| 75 | button hole fixture, drill jig 75 |
| 80 | drill bit 80 |
| 90 | button hole size chart 90 |
| 95 | safety label 95 denoting that the laser pointer kit meticulously follows the government regulations for laser pointers including those required by the Federal Drug Administration (FDA) and the International Electrotechnical Commission (IEC). |
| 100 | laser pointer kit 100 |

DETAILED DESCRIPTION AND PREFERRED MODE OF IMPLEMENTATION

This invention relates to woodworking project kits. Specifically, this invention pertains to a project building a laser pointer kit which is designed to provide a woodworker the necessary hardware to build a laser pointer with a cylindrical enclosure created by the woodworker.

The advantages for the Laser pointer kit for woodworkers 100 are listed above in the introduction. They are succinctly:

A. Providing multiple on/off buttons 19 of varying heights such that the woodworker is not constrained for a specific diameter of the wood body 10. It will provide more options of sizes for the woodworker such that the on/off button 19 protruding from the wood body 10 is of a user-preferred height in terms of function and aesthetics.

B. This allows a fitment to the round brass tube 13 such that it will minimize the "play" or feel "loose" to the user while actuating the on/off button 19.

C. The laser module housing 18 has a feature in which the laser module PCB 32 of the laser module 17 sits on the laser module housing shelf 36. This allows a solid base so that when the user actuates the on/off button 19, it will reliably actuate the laser module tact switch 31. Also, it provides support to the laser module PCB 32 such that it will not flex thus causing damage to the PCB itself.

D. The laser module brass cylinder 34 is one terminal of the electric connection. (in this example the "+" <positive>). The laser module battery spring 33 is the other terminal (in this example the "−"<negative>. To satisfy the electric connection of the batteries, the laser module brass cylinder 34 "+" conducts to the laser module sleeve 12, which conducts to the brass tube 13, which conducts to the battery sleeve 15, which conducts to the battery cap 16, which conducts to the "+" of the battery. The second battery is in series with the first battery. The second battery "−" conducts to the laser module battery spring 33. When the user presses the on/off button 19 it will complete the electrical path to turn on the laser module 17.

E. The tube spring 21 provides a benefit to allow more variability in the length of the overall assembled laser pointer kit 50/51. This will allow the unit to be functional with or without installing the pocket clip 14. It will also allow if the user happens to accidentally cut into the brass tube 13 while turning the wood body 10. Without the tube spring 13, the tolerance of the length is very small to allow proper function. This gives the woodworker flexibility in the construction.

F. This prevents the batteries inside the brass tube 13 from rattling inside if the user shakes the assembled laser pointer kit 50,51. It provides a snug fit for the batteries to fit in the brass tube 13 with a common diameter tube size. It also provides the proper placement of the laser module housing 18 inside the brass tube 13 in conjunction with the tube spring 21.

G. The design aspects of this laser module housing 18 is developed with a unique way to retain the on/off button 19 while the laser pointer 50 is assembled. This method provides an interface between the on/off button 19 and the tact switch 31 on the laser module 18. This is a critical design aspect that has allowed a kit 100 like this. The other kits on the market have been ones with an entirely pre-assembled laser module/on/off button which basically equates to half of a laser pointer. This means that the woodworker only has the creative freedom to turn the other half. This new, unique design doesn't require a metal housing. That feature without a metal housing allows the entire body of the laser pointer to be part of the body and artistic instrument created by the wood turner.

A preferred special laser pointer kit 100 comprising: (a) a body 10 with two ends, made of durable wood materials with a hollow opening 10A throughout length of the body 10, with an on/off button hole 30 at one end, and with a battery tube 13 placed inside the hollow opening 10A; (b) a laser module cap 11 with a threaded connection 11A to connect the module cap 11 to a laser sleeve 12; (c) a laser module sleeve 12 with a threaded connection 12A to connect the laser module sleeve 12 to the module cap 11 and a set of ridges 12B to connect the laser module sleeve 12 to the battery tube 13; (d) the brass Tube 13 with a hollow opening 13A throughout length of the brass tube 13; (e) a battery sleeve 15 with a threaded connection 15A to connect the battery sleeve 15 to a battery cap 16 and a set of ridges 15B to connect the battery sleeve 15 to the brass tube 13; (f) the battery cap 16 with a threaded connection 16A to connect a battery cap 16 the battery sleeve 15; (g) a laser module housing 18 comprised of a laser module tact switch 31; a laser module brass cylinder 31A; a laser module printed circuit board 32; a laser module battery spring 33; a laser module brass cylinder 34; a laser module housing 36 spring board 35; and a laser module housing shelf 36 wherein altogether these components are considered the laser module 17; (h) an on/off button 19 placed in the on/off button hole 30 of the body 10; (i) a battery tube 20 with a hollow opening 20A throughout length of the battery tube 20 and inter-placed between a tube spring 21 and the laser module housing 18; (j) the tube spring 21 inter-placed between the battery cap 16 and the battery tube 20; and (k) a safety label 95 wherein with these components and a set of batteries 70 a woodworker is able to create a hand-crafted laser pointer.

There is shown in FIGS. 1-11 a complete description and operative embodiment of the Laser pointer kit for woodworkers 100. In the drawings and illustrations, one notes well that the FIGS. 1-11 demonstrate the general configuration and use of this product. The various example uses are in the operation and use section. The accompanying drawings, which are incorporated in and constitute a part of this specification, illustrate an embodiment of the laser pointer kit for woodworkers 100 that is preferred. The drawings together with the summary description given above and a detailed description given below serve to explain the principles of the device 100. It is understood; however, that the laser pointer kit for woodworkers 100 is not limited to only the precise arrangements and instrumentalities shown. Other examples of laser pointer kit for woodworkers devices and uses are still understood by one skilled in the art of making laser pointing devices to be within the scope and spirit shown here.

FIG. 1 depicts an exploded view of all the parts required to assemble a laser kit 100 except for two AAA-batteries 70. Shown in this exploded view are: a body 10 with two ends and made of a durable material (supplied by woodworker) various hard and soft woods, plastic, ivory, metals, stone, antlers, horns, etc.; a hollow opening 10A throughout length of the body 10; a laser module cap 11; means to connect 11A the laser module cap 11 such as threads, interference fit, conductive adhesive, etc. to the laser module sleeve 12; a laser module sleeve 12; means to connect 12A the laser module sleeve 12 such as threads, interference fit, conductive adhesive, etc. to the laser module cap 11 that may be finished as chrome, titanium, gold, black titanium, 10K gold and rhodium; means to connect 12B the laser module sleeve 12 such as ribs, interference fit, conductive adhesive, etc. to the brass tube 13; a brass tube 13; a hollow opening 13A throughout length of the brass tube 13; a pocket clip 14; a battery sleeve 15; means to connect 15A battery sleeve 15 such as threads, ridges, interference fit, conductive adhesive, etc. to a battery cap 16; means to connect 15B the battery sleeve 15 such as ribs, interference fit, conductive adhesive, etc. to the brass tube 13; a battery cap 16; a means to connect 16A a battery cap 16 such as threads, ridges, interference fit, conductive adhesive, etc. to the battery sleeve 15; a laser module 17; a laser module housing 18; an on/off button 19; a battery tube 20; a hollow opening 20A throughout length of the battery tube 20; a tube spring 21; an on/off button hole 30; and a laser pointer kit 100. With these components, the laser pointer kit will comprise of all the necessary hardware excluding the wood blank to be able to create a hand-crafted laser pointer. The laser module 17 has a laser light color as a red Dot (635 nm wavelength) or green dot (515 nm wavelength). The laser module wavelength: 635 nm (red) or 515 nm (green). Other approximate technical specifications of the laser module 17—for example and not as a limitation—include: laser module class—3R or 2; laser module power: 5 mW Max (class 3R) or 1 mW Max (Class 2); operating voltage: 2.5V-3.3V; laser beam spot size from 30 ft: <0.5 inch; and laser diode life expectancy: 10,000 hrs. The laser modules 17 are certified to meet FDA and IEC standards. Current examples of what is contemplated and offered are four laser modules: (1) class 2 red rot laser module (1 mW max power)—acceptable for sale anywhere laser pointers are permitted; (2) class 3R red dot laser module (5 mW max power)—only sold to U.S. and Canada based customers; (3) class 2 green dot laser module (1 mW max power)—acceptable for sale anywhere laser pointers are permitted; and (4) class 3R green dot laser module (5 mW max power)—only sold to U.S. and Canada based customers.

FIGS. 2A through 2F are views of an assembled laser pointer kit 50 with the turned wood or body 10 from the woodworker the body having two ends and made of a durable material. Portrayed in these views are: a body 10 (supplied by woodworker) of various hard and soft woods, plastic (many times resin, some reinforced), ivory, metals, stone, antlers, horns, etc.; a laser module cap 11; means to connect 11A the laser module cap 11 such as threads, interference fit, conductive adhesive, etc. to the laser module sleeve 12; a pocket clip 14; a battery cap 16; means to connect 16A battery cap 16 such as such as threads, ridges, interference fit, conductive adhesive, etc. to the battery sleeve 15; an on/off button 19; an on/Off Button hole 30; a laser module battery spring 33; an assembled laser pointer kit 50; and a safety label 95 denoting that the laser pointer kit meticulously follows the government regulations for laser pointers including those required by the Federal Drug Administration.

FIG. 3 is a view of an assembled laser kit with pocket clip 51 with the turned wood body 10 from the woodworker. Shown here are: a pocket clip 14; an on/off button 19; an on/Off Button hole 30; an assembled laser pointer kit 51 with pocket clip and a safety label 95.

FIG. 4 is a cross sectional view of the Assembled laser pointer kit 50. Demonstrated features and components are: a body 10 (supplied by woodworker) with two ends and made of a durable material such as various hard and soft woods, plastic, ivory, metals, stone, antlers, horns, etc.; a laser module cap 11 that may be finished as chrome, titanium, gold, black titanium, 10K gold and rhodium; a laser module sleeve 12; a brass tube 13; a laser module 17; a laser module housing 18; an on/off button 19; an on/off button hole 30; a laser module tact switch 31; a laser module PCB (printed circuit board) 32; a laser module housing 36 spring board 35; and a laser module housing shelf 36. The laser module housing 18 is designed to align the laser module and provide a way for the on/off button 19 to be able to actuate the laser module tact switch 31 on the laser module 17. The laser module housing 18 is designed to retain the on/off button 19 in place and will not allow it to fall out of the housing. The laser module housing 18 is designed to allow multiple button position heights giving the woodworker flexibility to customize the size and contour of the laser pointer. The laser module housing spring board 35 provides an interface for the on/off button 19 to the laser module tact switch 31 on the laser module PCB 32 of the laser module 17 while eliminating the excessive movement of the on/off button 19 and allows for the woodworker to install the laser module 17 into the laser module housing 18 while keeping the on/off button 19 in position.

FIGS. 5 A through 5 D are detailed views of the laser module housing 18 depicting the laser module housing spring board 35 and laser module housing shelf 36. Provided in these sketches are: a laser module housing 18; a laser module housing 36 spring board 35; and a laser module housing shelf 36.

FIG. 6 is a view of the laser module 17 with references to specific components of the laser module 17. Provided components are: a laser module tact switch 31; laser module brass cylinder 31A; a laser module PCB (printed circuit board) 32; and a laser module battery spring 33.

FIG. 7 depicts the electrical path to complete the circuit of the laser pointer kit 100. Demonstrated as part of this circuit are: a laser module cap 11; means to connect 11A the laser module cap 11 such as threads, interference fit, conductive adhesive, etc. to the laser module sleeve 12; a laser module sleeve 12; a means to connect 12A the laser module sleeve 12 such as threads, ridges, interference fit, conductive adhesive, etc.; means to connect 12B the laser module sleeve 12 such as ribs, interference fit, conductive adhesive, etc. to the brass tube 13 a brass tube 13; a battery sleeve 15; a means to connect 15A battery sleeve 15 as such as threads, ridges, interference fit, conductive adhesive, etc.; means to connect 15B the battery sleeve 15 such as ribs, interference fit, conductive adhesive, etc. to the brass tube 13; a battery cap 16; a means to connect 16A a battery cap 16 such as threads, ridges, interference fit, conductive adhesive, etc.; a laser Module Tact Switch 31; and a module brass cylinder 31A. The laser kits utilize the brass tube 13 as a conductor to complete the electrical path needed to power the laser module 17.

Figure 10:
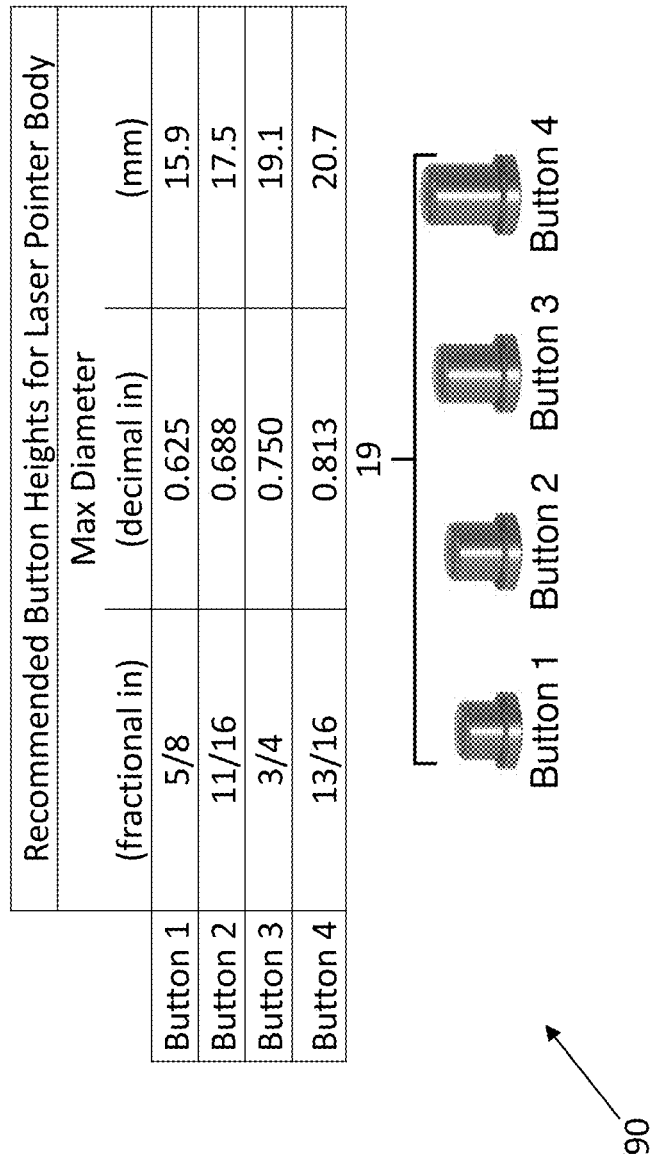
FIG. 10 is the table 90 and view of the optional buttons 19 for the laser pointer body 10.
Figure 11:
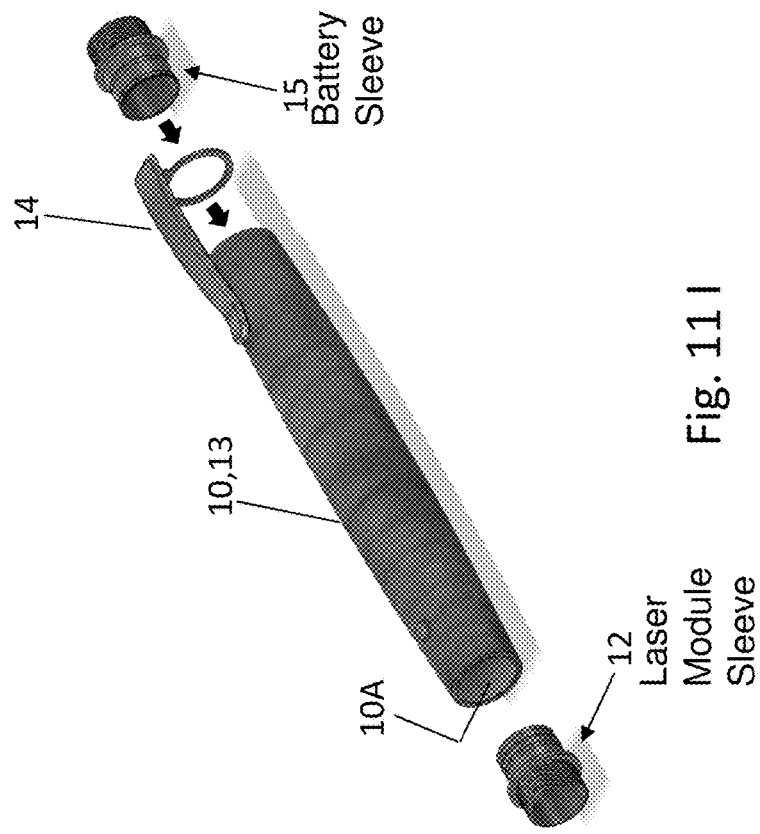
FIGS. 11 A through 11 N are detailed views of the assembly steps to build the laser pointer kit 100.
Figure 11:
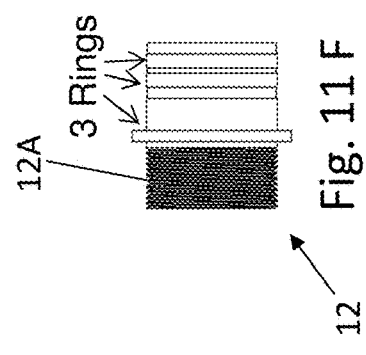
Figure 11:
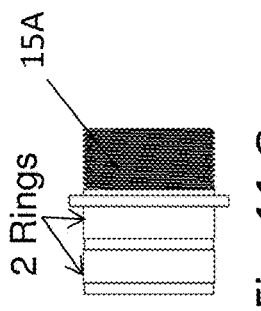
Figure 11:
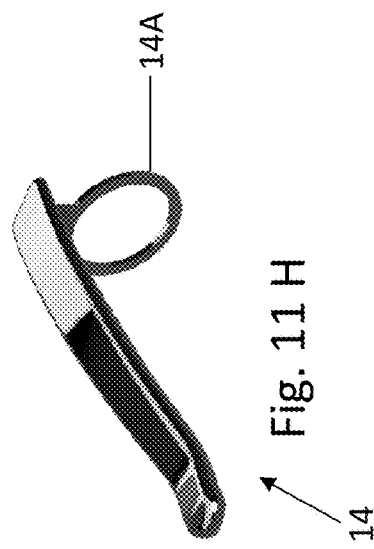

FIGS. 8 A and 8 B are detailed views of the tools required 63 to assemble laser kit 100 and an isometric drawing of the component parts of the laser kit 100. FIGS. 9 A through 9 D are detailed views of turning the laser pointer body 10 depicting how the body is sized and prepared. FIG. 10 is the table 90 and view of the optional buttons 19 for the laser pointer body 10. FIGS. 11 A through 11 N are detailed views of the assembly steps to build the laser pointer kit 100. These all relate to the operation and are described below in the operation section.

The details mentioned here are exemplary and not limiting. Other specific components and manners specific to describing a laser pointer kit for woodworkers 100 can be added as a person having ordinary skill in the field of the art of making laser pointer devices and their uses well appreciates.

Operation Section

The laser pointer kit for woodworkers 100 has been described in the above embodiment. The manner of how the device operates is described below. One notes well that the description above and the operation described here must be taken together to fully illustrate the concept of the special laser pointer kit 100. A preferred special laser pointer kit 100 comprising: (a) a body 10 with two ends, made of durable wood materials with a hollow opening 10A throughout length of the body 10, with an on/off button hole 30 at one end, and with a battery tube 13 placed inside the hollow opening 10A; (b) a laser module cap 11 with a threaded connection 11A to connect the module cap 11 to a laser sleeve 12; (c) a laser module sleeve 12 with a threaded connection 12A to connect the laser module sleeve 12 to the module cap 11 and a set of ridges 12B to connect the laser module sleeve 12 to the battery tube 13; (d) the brass tube 13 with a hollow opening 13A throughout length of the brass tube 13; (e) a battery sleeve 15 with a threaded connection 15A to connect the battery sleeve 15 to a battery cap 16 and a set of ridges 15B to connect the battery sleeve 15 to the brass tube 13; (f) the battery cap 16 with a threaded connection 16A to connect a battery cap 16 the battery sleeve 15; (g) a laser module housing 18 comprised of a laser module Tact Switch 31; a laser module brass cylinder 31A; a laser module printed circuit board 32; a laser module battery spring 33; a laser module brass cylinder 34; a laser module housing 36 spring board 35; and a laser module housing shelf 36 wherein altogether these components are considered the laser module 17; (h) an on/off button 19 placed in the on/off button hole 30 of the body 10; (i) a battery tube 20 with a hollow opening 20A throughout length of the battery tube 20 and inter-placed between a tube spring 21 and the laser module housing 18; (j) the tube spring 21 inter-placed between the battery cap 16 and the battery tube 20; and (k) a safety label 95 wherein with these components and a set of batteries 70 (double A, triple A, AAAA, C or equal; rechargeable or not; lithium ion, alkaline, nickel cadmium, nickel metal hydride, or the like) a woodworker is able to create a hand-crafted laser pointer.

FIGS. 8 A and 8 B are detailed views of the tools required 63 to assemble laser kit 100 and an isometric drawing of the component parts of the laser kit 100. Shown here are: a set of tools required 63 to assemble a laser kit 100 in FIGS. 8 A—12.5 mm drill bit; approximately 5/32 inch drill bit (common jobber type 118-degree-point angle or similar, brad point is not recommended); approximately 12.5 mm barrel trimmer; laser pointer bushings; approximately 7 mm mandrel; thick Cyanoacrylate glue (here after CA glue), polyurethane glue or epoxy; on/off button hole fixture, drill jig 75 (recommended); and shop tweezers (recommended). The isometric in FIG. 8 B shows: a body 10 (supplied by woodworker) various hard and soft woods, plastic (many of these are resin, some are reinforced), ivory, metals, stone, antlers, horns, etc.; a laser module cap 11; a laser module sleeve 12; a brass tube 13 (inside of body 10); a battery sleeve 15; a battery cap 16; a laser module 17; an on/off button 19; a battery tube 20; a tube spring 21; an on/off button hole 30; and a laser pointer kit 100.

FIGS. 9 A through 9 D are detailed views of turning the laser pointer Body 10 depicting how the body is sized and prepared.

A. Blank Selection

This laser pointer kit 100 includes four on/off buttons 19 of different heights. The button options allow for the flexibility to turn laser pointer bodies 10 of varying shapes and sizes up to a diameter of approximately 0.803 inch/20.4 mm at the on/off button hole 19. The size of the blank 10 should be considered with this in mind. For a turned blank that is typical in size and shape, an approximately $7/8^{th}$ inch square blank 10 is recommended. The blank must be at least 5 inches in length. FIG. 9A.

B. Turning the Laser Pointer Body

1. Drill the blank 10 with an approximately 12.5 mm drill bit.
2. Rough up the surface of the brass tube 13 with sandpaper prior to gluing the brass tube 13 in the laser pointer blank 10. This will improve the glue bond between the brass tube 13 and the laser pointer blank 10.
3. Glue the brass tube 13 into the laser pointer blank 10 with a thick CA glue, polyurethane glue or epoxy. Be careful to avoid glue inside the brass tube 13 that will interfere with the sleeves 12, 15 during assembly.
4. Square the ends of the blank 10 to be turned with a barrel trimmer, or by sanding, so the ends of the blank 10 are perpendicular and flush/even with the brass tube 13. This is an important step to ensure that the laser module sleeve 12 and battery sleeve 15 are flush with the body 10 of the laser pointer after assembly. Use caution while trimming the ends to avoid shortening the length of the brass tube 13. This could cause assembly issues if the length of the laser pointer body is shortened significantly.
5. Using a mandrel 61 and bushings 62, chuck the laser pointer blank 10 on the lathe. Avoid applying excessive pressure to the mandrel 61 with the lathe tail stock. Too much pressure can cause the mandrel 61 to flex, distorting the shape of the laser pointer body 10 when turned. FIG. 9B.
6. Turn the blank 10 to the desired form. The final laser pointer body can be a maximum of approximately 0.803 inch/20.4 mm in diameter at the on/off button hole which is located approximately 0.5 inch/12.7 mm from the front end of the laser pointer body. FIG. 9C.
7. Once the laser pointer body has been turned, sand the laser pointer body to the desired finish depending on the material of the laser pointer body.
8. Remove the laser pointer body from the mandrel 61 and remove the bushings 62. Drill the on/off button hole 30 on the end of the laser pointer body 10 that will receive the on/off button 19. For best results use a standard approximately $5/32^{nd}$ inch drill bit in a drill press, drilling slowly at a higher revolutions per minute (RPM). Masking tape can be applied to the laser pointer blank 10 where the hole 30 will be drilled as an added precaution to avoid tear out. There are optional jigs available to precisely place the on/off button hole 19 at the correct location on the laser pointer body 10, however one might prefer building one's own jig to perform this task. FIG. 9D.
9. After the on/off button hole 30 is drilled, return the laser pointer body 10 to the lathe for final sanding and finishing. Most finishes won't impede installation of the on/off button. For finishes such as CA glue that layer and interfere with the on/off button installation, it's recommended to gently file the on/off button hole 30 area with a round needle file using a downward stroke.

FIG. 10 is the table 90 and view of the four (4) optional buttons 19 for the laser pointer body 10. These sizes are shown for example and not as a limitation. There are four (4) on/off buttons included in this kit 100 that vary in height to provide an aesthetically pleasing look to the completed laser pointer. Buttons 19 are included to accommodate laser pointer body diameters ranging from a flat body of approximately 0.626 inch/14.4 mm to a max of approximately 0.803 inch/20.4 mm at the on/off button hole. One can trial fit the buttons 19 to determine which button suits the finished look one is going for; however, there are button height recommendations in the table below that guide one toward finding the smallest functional button possible. See FIG. 10. NOTE: The button must extend approximately 0.059 inch/1.5 mm above the laser pointer body. This clearance offers an adequate button height to actuate the switch on the laser module 17. Once assembled, the on/off button 19 is locked in place with the sleeves 12, 15 that are pressed into the brass tube 13. Changing the button 19 after assembly isn't recommended because it requires removal of the battery sleeve 20 which can damage the battery sleeve 20 or the brass tube 13. Second NOTE: The diameters above are referenced from the center of the on/off button hole 30. These recommendations are intended to provide the smallest possible button 19, but one may prefer a larger button. The key thing to confirm is that the button 19 extends approximately 0.059 inch/1.5 mm above the turned body 10 so the laser pointer functions. Otherwise one has the creative freedom to choose the button one prefers.

FIGS. 11 A through 11 N are detailed views of the assembly steps to build the laser pointer kit 100.

Laser Pointer Assembly

1. Once the laser pointer body 10 has been finished, it's time for assembly. Start by installing the on/off button 19 in the laser pointer body 10. A pair of shop tweezers or thin needle nose pliers are recommended. It's easiest to hold the laser pointer body 10 upside down so gravity holds the on/off button 19 in place until step #3 below is completed. FIG. 11A.
2. Once the desired on/off button 19 is selected and installed in the laser pointer body 10, insert the laser module housing 18 into the back end of the brass tube 13 oriented as shown below. Using a long and thin tool such as a screw driver or a pin punch, slide the laser module housing 18 up to the on/off button 19, aligning the on/off button 19 with the button channel in the laser module housing. Hold the assembly upside down during this step so gravity holds the on/off button 19 in place while the laser module housing 18 is installed. FIG. 11 B.
3. Once the laser module housing 18 is installed over the on/off button 19, the button is secure and will no longer fall out of the button hole 30. FIG. 11 C.
4. Insert the battery tube 20 into the back end of the brass tube 13, sliding it up the brass tube 13 until it's flush with the laser module housing FIG. 11 D.
5. Insert the spring 21 into the back end of the brass tube, sliding it up the brass tube 13 until it's flush with the battery tube 20. FIG. 11 E.
6. NOTE: Prior to step 6, clearly identify the laser module sleeve 12 from the battery sleeve 15. The laser module sleeve 12 has a retainer ring inside that holds the laser module 18 in place. The laser module sleeve 12 must be installed in the front end of the laser pointer body 10, which is the end closest to the on/off button 19.
7. The laser module sleeve 12 has a retaining ring inside. There are three ring grooves on the outside of the laser module sleeve 12 to help with identification. FIG. 11 F.
8. The battery sleeve 15 looks very similar to the laser module sleeve 12. There are two ring grooves on the battery sleeve 15. FIG. 11 G.
9. NOTE: An optional pocket clip 14 is included with the kit. If using the pocket clip, remember to install the pocket clip 14 on the battery sleeve 15 prior to pressing the battery sleeve 15 into the brass tube 13. FIG. 11 H.
10. Using a press or vise, press the laser module sleeve 12 and battery sleeve 15 into the ends of the brass tube 13 one at a time. To avoid damage to the laser pointer body 10 and sleeves 12,15, pad the jaws on the press or vise. FIG. 11 I.
11. The laser pointer 50, 51 can be assembled with or without the pocket clip 14.
12. Insert the laser module 17 (spring end 33 first) into the front end of the laser pointer body 10. The laser module 17 slides above and rests on the supporting rails/housing shelf 36 inside the laser module housing 18 until the brass housing 31A on the laser module 17 is flush with the retaining ring inside the laser module sleeve 12. The laser module tact switch 31 should be facing up so that it interfaces with the on/off button 19 properly (pictured below). FIG. 11 J.
13. Secure the laser module 17 in place by screwing the laser module cap 11 onto laser module sleeve 12. FIG. 11 K.
14. Install two AAA batteries 70 (not included) into the back end of the laser pointer. The negative (−) terminal on the battery inserts into the laser pointer body first and rests against the spring 33 on the laser module 17. FIG. 11 L.
15. Lock the AAA batteries 70 into place by screwing the battery cap 16 onto the battery sleeve 15. FIG. 11 M.
16. With a clean rag, remove any fingerprints or finish residue from the laser module cap 11. The safety label 95 must be placed on the laser module cap 11 centered in reference to the on/off button 19. Do not place the safety label 95 on the laser pointer body 10; the safety label 95 will not adhere well to certain finishes. FIG. 11 N.
17. NOTE: It's a violation of FDA regulations to sell or gift an assembled laser pointer without the safety label 95. The Laser Module 17 in the kit is certified to meet applicable U.S. laser safety requirements with label 95.
18. If selling or gifting this Laser Pointer to an End User, be sure to include the End User Manual. The information in the End User Manual must accompany the Laser Pointer.

With this description it is to be understood that the laser pointer kit for woodworkers 100 is not to be limited to only the disclosed embodiment of product. The features of the laser kit 100 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.)

subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A special laser pointer kit comprising:
   (a) a body with two ends, made of durable materials with a hollow opening throughout length of the body, with an on/off button hole at one end, and with a brass tube placed inside the hollow opening;
   (b) a laser module cap with a means to connect the module cap to a laser sleeve;
   (c) a laser module sleeve with a means to connect the laser module sleeve to the module cap and a means to connect the laser module sleeve to the brass tube;
   (d) the brass tube with a hollow opening throughout length of the brass tube;
   (e) a battery sleeve with a means to connect the battery sleeve to a battery cap and a means to connect the battery sleeve to the brass tube;
   (f) the battery cap with a means to connect a battery cap the battery sleeve;
   (g) a laser module housing;
   (h) an on/off button placed in the on/off button hole of the body;
   (i) a battery tube with a hollow opening throughout length of the battery tube and inter-placed between a tube spring and the laser module housing;
   (j) the tube spring inter-placed between the battery cap and the battery tube;
   (k) a safety label; and
   (l) a pocket clip and encircling ring inter-placed between the brass tube and the battery sleeve
   wherein with these components and a set of batteries a woodworker can create a hand-crafted laser pointer.

2. The special laser pointer kit of claim 1 wherein the laser module housing is further comprised of a laser module tact switch; a laser module brass cylinder; a laser module printed circuit board; a laser module battery spring; a laser module brass cylinder; a laser module housing spring board; and a laser module housing shelf wherein altogether these components are considered the laser module.

3. The special laser pointer kit of claim 2 designed to align the laser module and provide a way for the on/off button to be able to actuate the laser module tact switch on the laser module.

4. The special laser pointer kit of claim 2 wherein the laser module housing is designed and configured to retain the on/off button in place and will not allow it to fall out of the housing.

5. The special laser pointer kit of claim 2 wherein the laser module housing is designed and configured to allow multiple button position heights giving the woodworker flexibility to customize the size and contour of the laser pointer.

6. The special laser pointer kit of claim 2 wherein the Laser module housing spring board provides an interface for the on/off button to the laser module tact switch on the laser module printed circuit board of the laser module while eliminating the excessive movement of the on/off button and allows for the woodworker to install the laser module into the laser module housing while keeping the on/off button in position.

7. The special laser pointer kit of claim 2 wherein the brass tube is utilized as a conductor to complete the electrical path needed to power the laser module.

8. The special laser pointer kit of claim 2 wherein the laser module in the kit is certified to meet applicable U.S. laser safety requirements and is labeled with a safety label.

9. A special laser pointer kit comprising:
   (a) a body with two ends, made of durable wood materials with a hollow opening throughout length of the body, with an on/off button hole at one end, and with a brass tube placed inside the hollow opening;
   (b) a laser module cap with a threaded connection to connect the module cap to a laser sleeve;
   (c) a laser module sleeve with a threaded connection to connect the laser module sleeve to the module cap and a set of ridges to connect the laser module sleeve to the brass tube;
   (d) the brass tube with a hollow opening throughout length of the brass tube;
   (e) a battery sleeve with a threaded connection to connect the battery sleeve to a battery cap and a set of ridges to connect the battery sleeve to the brass tube;
   (f) the battery cap with a threaded connection to connect a battery cap the battery sleeve;
   (g) a laser module housing comprised of a laser module tact switch; a laser module brass cylinder; a laser module printed circuit board; a laser module battery spring; a laser module brass cylinder; a laser module housing spring board; and a laser module housing shelf wherein altogether these components are considered the laser module;
   (h) an on/off button placed in the on/off button hole of the body;

(i) a battery tube with a hollow opening throughout length of the battery tube and inter-placed between a tube spring and the laser module housing;

(j) the tube spring inter-placed between the battery cap and the battery tube; and (k) a safety label wherein with these components and a set of batteries a woodworker can create a hand-crafted laser pointer.

10. A process to assemble a special laser pointer kit comprising:

Step 1: Prepare and finish a laser pointer body;

Step 2: Install an on/off button in the laser pointer body;

Step 3: Insert a laser module housing into the back end of an oriented brass tube and while holding the assembly upside down, slide the laser module housing up to the on/off button, thereby aligning the on/off button and the laser module housing;

Step 4: Insert a battery tube into the back end of the brass tube, sliding the battery tube up the brass tube until the brass tube is flush with the laser module housing;

Step 5: Insert a spring into the end of the brass tube with the end being opposite the laser module housing, sliding the spring up the brass tube until the spring is flush with the battery tube;

Step 6: Identify the laser module sleeve with three ribs from the battery sleeve with two ribs and install the laser module sleeve at the end of the body which is the end closest to the on/off button;

Step 7: Install the battery sleeve with two ribs at the end of the body which is the end farthest from the on/off button;

Step 8: Using a simple press/vise, press the laser module sleeve and battery sleeve into the ends of the brass tube one at a time;

Step 9: Insert the laser module with the spring end first into the end of the laser pointer body closest to the button;

Step 10: Push the laser module on the slides until the laser module is flush with the laser module sleeve;

Step 11: Secure the laser module in place by screwing the laser module cap onto the laser module sleeve;

Step 12: Install the batteries into the end of the laser pointer furthest from the button;

Step 13: Lock the batteries into place by screwing the battery cap onto the battery sleeve;

Step 14: With a clean rag, clean and remove any fingerprints or finish residue from the laser module cap and place the safety label onto the laser module cap.

11. The process to assemble a special laser pointer kit of claim 10 wherein the Step 1: Prepare and finish a laser pointer body is further comprised of:

Step A: Drill the blank with an approximately 12.5 mm drill bit;

Step B: Rough up the surface of the brass tube with sandpaper prior to gluing the brass tube in the laser pointer blank;

Step C: Glue the brass tube into the laser pointer blank with a thick CA glue, polyurethane glue or epoxy;

Step D: Square the ends of the blank to be turned with a barrel trimmer, or by sanding, so the ends of the blank are perpendicular and flush/even with the brass tube;

Step E: Using a mandrel and bushings, chuck the laser pointer blank on the lathe and avoid applying excessive pressure to the mandrel with the lathe tail stock;

Step F: Turn the blank to the desired form;

Step G: Once the laser pointer body has been turned, sand the laser pointer body to the desired finish;

Step H: Remove the laser pointer body from the mandrel and remove the bushings and drill the on/off button hole on the end of the laser pointer body that will receive the on/off button; and Step I: After the on/off button hole is drilled, return the laser pointer body to the lathe for final sanding and finishing.

* * * * *